US012032454B2

(12) United States Patent
Brown et al.

(10) Patent No.: US 12,032,454 B2
(45) Date of Patent: Jul. 9, 2024

(54) SYSTEMS AND METHODS FOR DEFINING, CAPTURING, AND EXTRACTING DATA FROM DATA REPOSITORIES TO SPECIFICATION

(71) Applicant: JPMORGAN CHASE BANK, N.A., New York, NY (US)

(72) Inventors: Kevin Brown, Dorset (GB); Simon Mortimer, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 169 days.

(21) Appl. No.: 17/650,634

(22) Filed: Feb. 10, 2022

(65) Prior Publication Data

US 2023/0251939 A1 Aug. 10, 2023

(51) Int. Cl.
*G06F 11/00* (2006.01)
*G06F 11/14* (2006.01)
*G06F 11/36* (2006.01)
*G06F 16/14* (2019.01)

(52) U.S. Cl.
CPC ........ *G06F 11/1469* (2013.01); *G06F 11/368* (2013.01); *G06F 16/152* (2019.01)

(58) Field of Classification Search
CPC ............... G06F 11/1469; G06F 11/368; G06F 11/0727; G06F 11/1402; G06F 11/1435; G06F 11/1438; G06F 11/1448; G06F 11/1458; G06F 16/152
See application file for complete search history.

(56) References Cited

U.S. PATENT DOCUMENTS

| | | | | |
|---|---|---|---|---|
| 9,268,799 | B1* | 2/2016 | Qi | G06F 11/1469 |
| 2011/0099200 | A1* | 4/2011 | Blount | G06F 16/152 |
| | | | | 714/E11.03 |
| 2014/0279928 | A1* | 9/2014 | Vollmer | G06F 8/658 |
| | | | | 707/684 |
| 2016/0246687 | A1* | 8/2016 | Stark | G06F 11/1435 |
| 2019/0377643 | A1* | 12/2019 | Zhang | G06F 11/1469 |
| 2022/0147333 | A1* | 5/2022 | Malvankar | G06F 40/20 |
| 2023/0115489 | A1* | 4/2023 | Devroy | G06F 11/1469 |
| | | | | 711/162 |

\* cited by examiner

*Primary Examiner* — Joseph D Manoskey
(74) *Attorney, Agent, or Firm* — GREENBERG TRAURIG LLP

(57) ABSTRACT

A repository definition computer program may (1) retrieve repository data from data repositories; (2) identify a data repository structure for each data repository; (3) generating data repository definitions for the data repositories; (4) provide the data repository definitions in a data serialization language to a repository management system; and (5) generate a hash of each file in the data repositories and save a copy of each file named its hash. A UAT management system computer program may (6) execute a repository extract process to repave one the data repositories with the hash-named files. The repository extract computer program may (7) retrieve the data repository definitions for the data repository being repaved from a repository management system server; (8) retrieve the hash-named files from object storage for the data repository being repaved; and (9) recreate the data repository from the data repository definitions using hard links to the hash-named files.

17 Claims, 3 Drawing Sheets

SYSTEMS AND METHODS FOR DEFINING, CAPTURING, AND EXTRACTING DATA FROM DATA REPOSITORIES TO SPECIFICATION

BACKGROUND OF THE INVENTION

1. Field of the Invention

Embodiments generally relate to systems and methods for defining, capturing, and extracting data from data repositories to specification.

2. Description of the Related Art

Data repositories are generally defined by an engineering release team, and the distribution of these repositories to the many endpoints is unreliable. Thus, it is difficult to use these data repositories to recover failed databases to specification.

SUMMARY OF THE INVENTION

Systems and methods for defining, capturing, and extracting data from data repositories are disclosed. In one embodiment, a method for defining, capturing, and extracting data from data repositories, comprising: (1) retrieving, by a repository definition computer program executed by a staging server, data repository data from one or more data repositories; (2) identifying, by the repository definition computer program, a data repository structure for each data repository; (3) generating, by the repository definition computer program, data repository definitions for one or more of the data repositories based on the data repository data and the data repository structure; (4) providing, by the repository definition computer program, the data repository definitions in a data serialization language to a repository management system; (5) generating, by the repository definition computer program, a hash of each file in each data repository and saving a copy of each file named its hash; (6) executing, by a UAT management system computer program executed by a User Acceptance Testing (UAT) management system server, a repository extract process to repave one of the one or more data repositories with the hash-named files using data repository definitions on a UAT branch of the data repository definitions; (7) retrieving, by a repository extract computer program executed by a management system server, the data repository definitions for the data repository being repaved from a repository management system server; (8) retrieving, by the repository extract computer program, the hash-named files from object storage for the data repository being repaved; and (9) recreating, by a repository extract computer program, the data repository from the data repository definitions using hard links to the hash-named files in local storage.

In one embodiment, the data repository data may include a plurality of files and/or objects and metadata.

In one embodiment, the data repository definitions comprise original file names for each file, a hash value for each file, an identification of an owning user, and/or an identification of an owning group.

In one embodiment, the data serialization language may be YAML.

In one embodiment, a repository management system computer program executed by the repository management system may store the data repository definitions as new data repository definitions or updates existing data repository definitions with the data repository definitions.

In one embodiment, wherein the hash may be a SHA512 hash.

In one embodiment, the method may further include merging, by a repository management system computer program, a release branch with a master branch in the repository management system; and synchronizing, by the repository extract computer program, the master branch to build the data repository in accordance with a specification, wherein the repository extract computer program synchronizes the data repository definitions and retrieves the hash-named files from local storage.

According to another embodiment, a method for recovering data repositories may include: (1) receiving, by a repository extract computer program executed by a management server, a request to recover a data repository; (2) retrieving, by the repository extract computer program, data repository definitions for the data repository from a repository management system; (3) retrieving, by the repository extract computer program, a plurality of hash-named files for the data repository; (4) generating, by the repository extract computer program, hard links with target file names that point to each of the hash-named files; (5) validating, by the repository extract computer program, contents of each hash-named file by hashing the hash-named file and confirming that the hash matches the name of the hash-named file; and (6) repaving, by the repository extract computer program, the data repository with the validated files using the data repository definitions.

In one embodiment, the data repository definitions comprise original file names for each file, a hash value for each file, an identification of an owning user, and/or an identification of an owning group.

In one embodiment, the hash may be a SHA512 hash.

According to another embodiment, a system may include a data repository comprising files, objects, and metadata; a staging server executing a repository definition computer program; a repository management system server executing a repository management system computer program; a management system server executing a repository extract computer program; an object store; and a user acceptance testing (UAT) management server executing a UAT management system computer program. The repository definition computer program may retrieve data repository data from the data repository, may identify a data repository structure for the data repository; may generate data repository definitions for the data repository based on the data repository data and the data repository structure; may provide the data repository definitions in a data serialization language to the repository management system server; and may generate a hash of each file in the data repository and saves a copy of each file named its hash. The UAT management system computer program may execute a repository extract process to repave the data repository with the hash-named files using data repository definitions on a UAT branch of the data repository definitions, The repository extract computer program may retrieve the data repository definitions for the data repository being repaved from the repository management system server; may retrieve the hash-named files from the object store for the data repository; and may recreate the data repository from the data repository definitions using hard links to the hash-named files in local storage.

In one embodiment, the data repository data may include a plurality of files and/or objects and metadata.

In one embodiment, the data repository definitions comprise original file names for each file, a hash value for each file, an identification of an owning user, and/or an identification of an owning group.

In one embodiment, the data serialization language may be YAML.

In one embodiment, the repository management system computer program may store the data repository definitions as new data repository definitions or updates existing data repository definitions with the data repository definitions.

In one embodiment, the hash may be a SHA512 hash.

In one embodiment, the repository management system computer program may merge a release branch with a master branch in the repository management system server, and the repository extract computer program may synchronize the master branch to build the data repository in accordance with a specification and the repository extract computer program may synchronize the data repository definitions and retrieves the hash-named files from local storage.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for defining, capturing, and extracting data repositories according to specification. For example, embodiments may capture information from data repository structures, including metadata for the objects and files within the data repositories, and store that information for version control of releases, repaving, etc. The metadata may be stored in a data serialization language, such as Yet Another Markup Language (YAML), and in a repository management system, such as Bitbucket.

Embodiments may use the structure, content, checksum, ownership. and/or mode of the data repository being captured and store that as structured data in the data serialization language.

Embodiments may further generate a hash value (e.g., a SHA512 hash value or similar) for each file that is captured, and may store a file that is named with the hash value in storage, such as S3 object storage.

To recreate or repave the data repository, embodiments may retrieve the files named with the hash values and may recreate the data repository structure based on the stored information (e.g., the metadata in the repository management system) and may create a hard link of the original file names to the SHA512 hash-named local files, such as an additional name for an existing file on Unix-like operating systems. Each hard link behaves as an alternative filename. The data for the linked file, however, is not copied for each additional link name.

In one embodiment, embodiments may confirm that a hash of each file and may confirm that the hash matches the file name before using the file.

Figure 1:
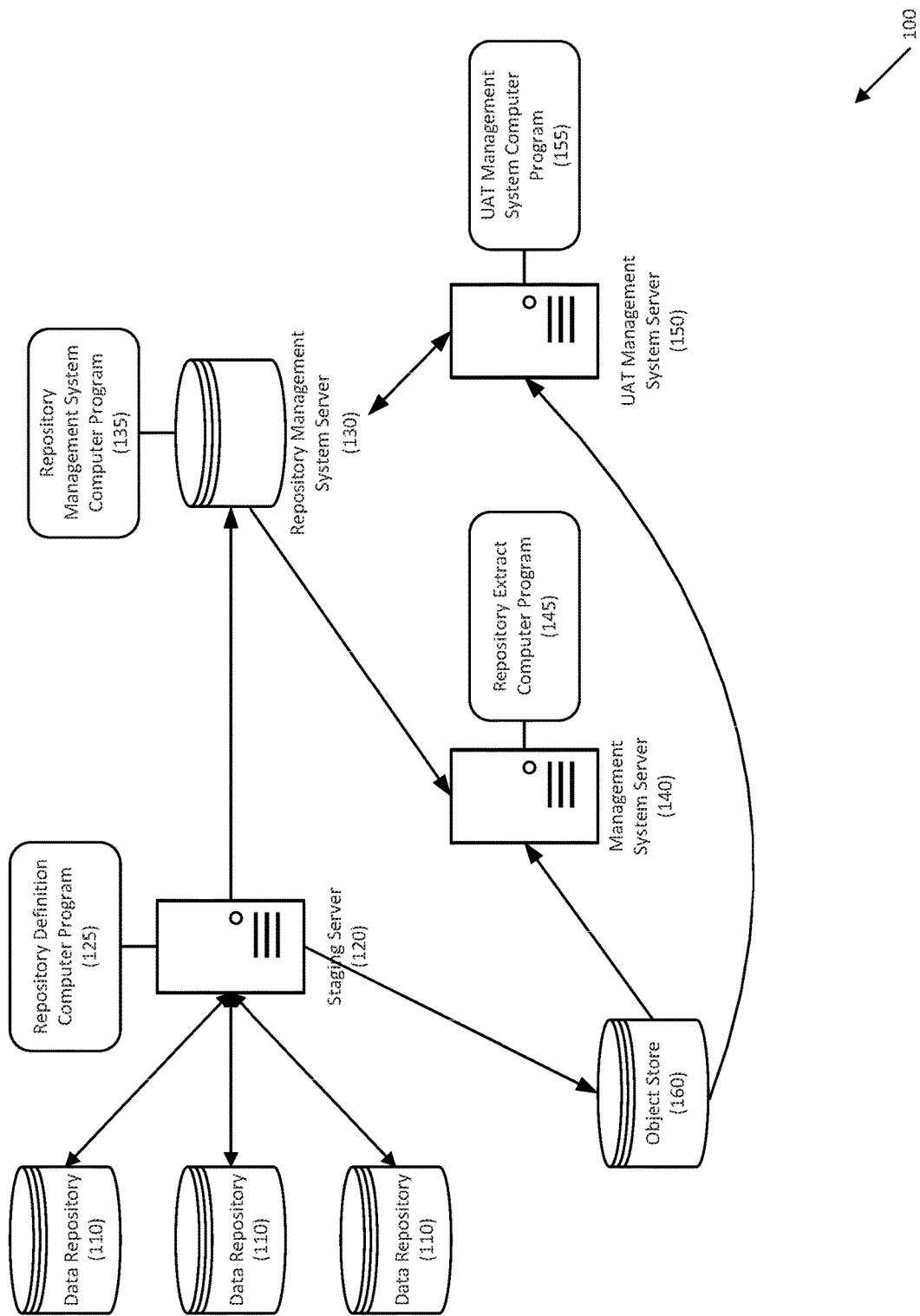
FIG. 1 depicts a system for defining, capturing, and extracting data from data repositories according an embodiment.

Referring to FIG. 1, a system for defining, capturing, and extracting data from data repositories is disclosed. System 100 may include one or more data repositories 110. Data repositories 110 may store data, including directories, symbolic links, and files.

System 100 may further include staging server 120, which may be any suitable server (e.g., cloud-based, physical, combinations thereof, etc.). Staging server 120 may execute repository definition computer program 125, which may retrieve and store data from data repositories 110, and restore or repave such data repositories with the stored data.

Repository definition computer program 125 may store files from data repositories 110 in object store 160. Object store 160 may be a cloud-based object store. In one embodiment, staging computer program 125 may rename the files with a hash value (e.g., a SHA512 or similar hash) based on the file's contents.

Staging computer program 125 may also store metadata from the data repositories in a data serialization language, such as Yet Another Markup Language (YAML), in repository management system server 130. An example of a repository management system is Bitbucket.

Repository management system server 130 may execute repository management system computer program 135.

System 100 may further include management system server 140 and User Acceptance Testing (UAT) management system server 150. These management systems may be used to install/update client computers. They may also extract the captured repositories and may hold local copies of the repositories.

Management system server 140 and UAT management system server 150 may execute management system server computer program 145 and UAT management system computer program 155, respectively.

Figure 2:
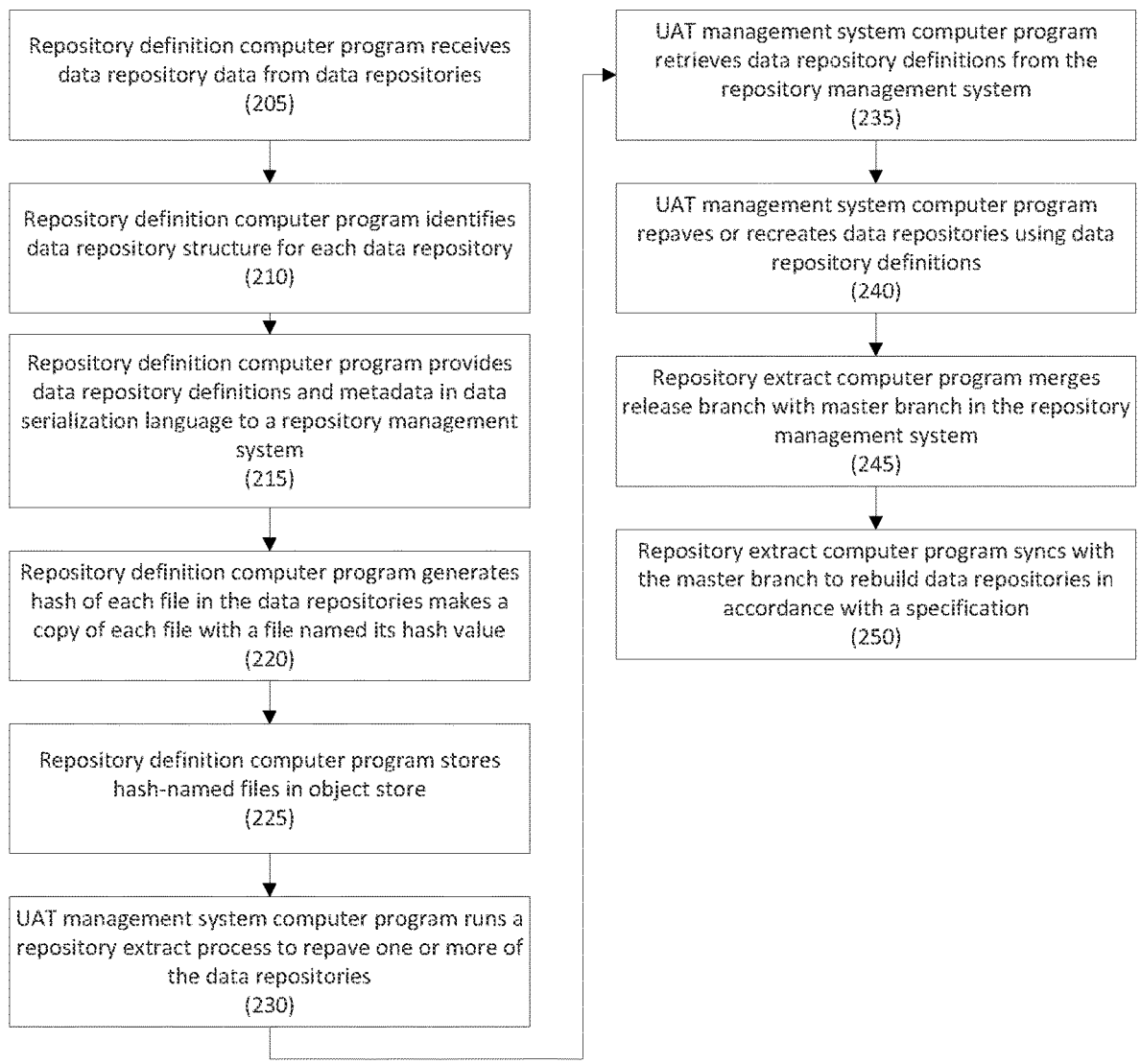
FIG. 2 depicts a method for defining, capturing, and extracting data from data repositories according an embodiment.

Referring to FIG. 2, a method for defining, capturing, and extracting data from data repositories is disclosed according an embodiment.

In step 205, a repository definition computer program executed by a staging server may retrieve data repository data from one or more data repositories. The data repository data may include files, objects, and metadata for the data repository.

In step 210, the repository definition computer program may identify a data repository structure for each data repository.

In step 215, the repository definition computer program may generate data repository definitions for each data repository and may provide the data repository definitions in a data serialization language to a repository management system server. For example, the data repository definitions may include the original file name (relative to the repository top level), its hash value, owning user, owning group, mode and other metadata. The repository definition computer program may write this information in a data serialization language, such as YAML.

The repository management system server may then store the data repository definitions as new data repository definitions, or it may update existing data repository definitions in the repository management system server.

In step 220, the repository definition computer program may generate a hash of each file in the data repositories, and may make a copy of each file and name the copy of the file with the hash. For example, the repository definition computer program may generate a SHA512 hash on the contents of each file, and may use that hash to name the file.

In step 225, the repository definition computer program may store the re-named files in object store, such as a cloud-based object store.

In step 230, a computer program executed by a UAT management system server may run a repository extract process to repave one or more of the data repositories with those in the object store using the data repository definitions on a UAT branch of the data repository definitions. The UAT branch may be a development branch within the repository management system server. The updated data repository definitions may be placed on the UAT branch, then once tested, may be promoted to the master branch for all systems, via, for example, a merge operation.

In step 235, a repository extract computer program may retrieve data repository definitions from the repository management system server.

In step 240, the repository extract computer program may repave or recreate one or more data repositories using data repository definitions. For example, the repository extract computer program may recreate the data repository structure and may use the data repository definitions to retrieve the hash-named files needed from storage.

As part of the process, the repository extract computer program may store the hash-named files in local storage so that the UAT management system server may link to the hash-named files.

Also as part of the process, the repository extract computer program may recreate one or more data repositories from the data repository definitions using hard links to the hash-named files in local storage.

For example, the repository extract computer program may run on the UAT management system server and the management system server—it is the same program, but UAT management system server uses the repository definitions from the release branch, while the management system server uses the master branch repository definitions. Thus, the UAT management system server and the management system server sync from the different definition branches.

In step 245, a repository management system computer program on one or more repository management system servers may merge a release branch with master branch in the repository management system server. Once the release branch is merged with the master, the master branch contains the latest definition of the data repositories. Any previous versions may be retained under the repository management system's version control.

In step 250, on all management system servers, the repository extract computer programs may synchronize with the master branch to build all data repositories in accordance with specification. The data repository definitions may be synchronized, and the hash-named files may be retrieved from local storage.

Figure 3:
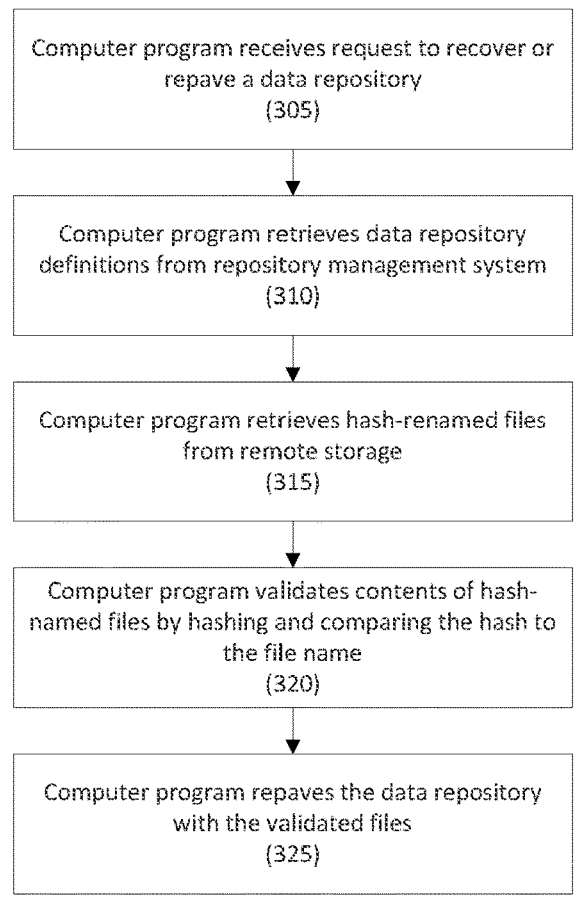
FIG. 3 depicts a method for recovering data repositories to specification using captured and stored data according an embodiment.

Referring to FIG. 3, a method for recovering data repositories using captured and stored data according an embodiment.

In step 305, on one or more management servers, a repository extract computer program may receive a request to recover or repave a data repository. The request may be from a user, from a device, etc.

In step 310, the computer program may retrieve data repository definitions from a repository management system server. The computer program may further retrieve any hash-named files that are not in local storage. The computer program may generate hard links with the target file names (e.g., the original file names) that point to the hash-named files.

In step 315, the computer program may retrieve the hash-named files from remote storage.

In step 320, the computer program may validate the contents of each hash-named file by hashing the hash-named file and comparing the hash to the name of the hash-named file.

In step 325, the computer program may repave the data repository with the validated files using the data repository definitions.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for defining, capturing, and extracting data from data repositories, comprising:
   retrieving, by a repository definition computer program executed by a staging server, data repository data from one or more data repositories;
   identifying, by the repository definition computer program, a data repository structure for each data repository;
   generating, by the repository definition computer program, data repository definitions for one or more of the data repositories based on the data repository data and the data repository structure;
   providing, by the repository definition computer program, the data repository definitions in a data serialization language to a repository management system;
   generating, by the repository definition computer program, a hash of the contents of each file in each data repository and saving a copy of each file named with its hash;
   executing, by a UAT management system computer program executed by a User Acceptance Testing (UAT) management system server, a repository extract process to repave one of the one or more data repositories with the hash-named files using data repository definitions on a UAT branch of the data repository definitions;
   retrieving, by a repository extract computer program executed by a management system server, the data repository definitions for the data repository being repaved from a repository management system server;
   retrieving, by the repository extract computer program, the hash-named files from object storage for the data repository being repaved; and
   recreating, by a repository extract computer program, the data repository from the data repository definitions using hard links to the hash-named files in local storage.

2. The method of claim 1, wherein the data repository data comprises a plurality of files and/or objects and metadata.

3. The method of claim 1, wherein the data repository definitions comprise original file names for each file, a hash value for each file, an identification of an owning user, and/or an identification of an owning group.

4. The method of claim 1, wherein the data serialization language comprises YAML.

5. The method of claim 1, wherein a repository management system computer program executed by the repository management system stores the data repository definitions as new data repository definitions or updates existing data repository definitions with the data repository definitions.

6. The method of claim 1, wherein the hash comprises a SHA512 hash.

7. The method of claim 1, further comprising:
   merging, by a repository management system computer program, a release branch with a master branch in the repository management system; and
   synchronizing, by the repository extract computer program, the master branch to build the data repository in accordance with a specification, wherein the repository extract computer program synchronizes the data repository definitions and retrieves the hash-named files from local storage.

8. A method for recovering data repositories, comprising:
   receiving, by a repository extract computer program executed by a management server, a request to recover a data repository;
   retrieving, by the repository extract computer program, data repository definitions for the data repository from a repository management system;
   retrieving, by the repository extract computer program, a plurality of hash-named files for the data repository, wherein the hash-named files are named based on a hash of the contents of the file;
   generating, by the repository extract computer program, hard links with target file names that point to each of the hash-named files;
   validating, by the repository extract computer program, contents of each hash-named file by hashing the hash-named file and confirming that the hash matches the name of the hash-named file; and
   repaving, by the repository extract computer program, the data repository with the validated files using the data repository definitions.

9. The method of claim 8, wherein the data repository definitions comprise original file names for each file, a hash value for each file, an identification of an owning user, and/or an identification of an owning group.

10. The method of claim 8, wherein the hash comprises a SHA512 hash.

11. A system, comprising:
    a data repository comprising files, objects, and metadata;
    a staging server executing a repository definition computer program;
    a repository management system server executing a repository management system computer program;
    a management system server executing a repository extract computer program;
    an object store; and
    a user acceptance testing (UAT) management server executing a UAT management system computer program;
    wherein:
      the repository definition computer program retrieves data repository data from the data repository;
      the repository definition computer program identifies a data repository structure for the data repository;
      the repository definition computer program generates data repository definitions for the data repository based on the data repository data and the data repository structure;
      the repository definition computer program provides the data repository definitions in a data serialization language to the repository management system server;

the repository definition computer program generates a hash of the contents of each file in the data repository and saves a copy of each file named with its hash;

the UAT management system computer program executes a repository extract process to repave the data repository with the hash-named files using data repository definitions on a UAT branch of the data repository definitions;

the repository extract computer program retrieves the data repository definitions for the data repository being repaved from the repository management system server;

the repository extract computer program retrieves the hash-named files from the object store for the data repository; and the repository extract computer program recreates the data repository from the data repository definitions using hard links to the hash-named files in local storage.

12. The system of claim 11, wherein the data repository data comprises a plurality of files and/or objects and metadata.

13. The system of claim 11, wherein the data repository definitions comprise original file names for each file, a hash value for each file, an identification of an owning user, and/or an identification of an owning group.

14. The system of claim 11, wherein the data serialization language comprises YAML.

15. The system of claim 11, wherein the repository management system computer program stores the data repository definitions as new data repository definitions or updates existing data repository definitions with the data repository definitions.

16. The system of claim 11, wherein the hash comprises a SHA512 hash.

17. The system of claim 11, wherein the repository management system computer program merges a release branch with a master branch in the repository management system server, and the repository extract computer program synchronizes the master branch to build the data repository in accordance with a specification and the repository extract computer program synchronizes the data repository definitions and retrieves the hash-named files from local storage.

* * * * *